(12) United States Patent
Weis et al.

(10) Patent No.: US 7,761,702 B2
(45) Date of Patent: Jul. 20, 2010

(54) METHOD AND APPARATUS FOR DISTRIBUTING GROUP DATA IN A TUNNELED ENCRYPTED VIRTUAL PRIVATE NETWORK

(75) Inventors: Brian E. Weis, San Jose, CA (US); Jan Vilhuber, San Jose, CA (US); Michael Lee Sullenberger, San Jose, CA (US); Frederic R.P. Detienne, Glons (BE)

(73) Assignee: Cisco Technology, Inc., San Jose, CA (US)

( * ) Notice: Subject to any disclaimer, the term of this patent is extended or adjusted under 35 U.S.C. 154(b) by 1241 days.

(21) Appl. No.: 11/107,532

(22) Filed: Apr. 15, 2005

(65) Prior Publication Data

US 2009/0083536 A1    Mar. 26, 2009

(51) Int. Cl.
    *H04L 9/00* (2006.01)
(52) U.S. Cl. .................. 713/153; 713/159; 713/180; 713/163; 713/156; 726/2; 726/15; 726/13
(58) Field of Classification Search ............ 726/13; 713/153
    See application file for complete search history.

(56) References Cited

U.S. PATENT DOCUMENTS

| | | | | |
|---|---|---|---|---|
| 5,737,422 A * | 4/1998 | Billings | ............... | 713/159 |
| 5,748,736 A * | 5/1998 | Mittra | ............... | 713/163 |
| 6,356,941 B1 * | 3/2002 | Cohen | ............... | 709/219 |
| 6,438,612 B1 * | 8/2002 | Ylonen et al. | ............... | 709/249 |
| 6,990,578 B1 * | 1/2006 | O'Brien et al. | ............... | 713/156 |
| 7,006,508 B2 * | 2/2006 | Bondy et al. | ............... | 370/410 |
| 7,305,704 B2 * | 12/2007 | Ofek et al. | ............... | 726/15 |
| 7,367,045 B2 * | 4/2008 | Ofek et al. | ............... | 726/2 |
| 7,398,398 B2 * | 7/2008 | Ofek et al. | ............... | 713/180 |
| 7,447,901 B1 * | 11/2008 | Sullenberger et al. | ....... | 713/153 |
| 2003/0126468 A1 * | 7/2003 | Markham | ............... | 713/201 |
| 2004/0205188 A1 * | 10/2004 | Ahlard et al. | ............... | 709/224 |
| 2006/0198368 A1 * | 9/2006 | Guichard et al. | ............ | 370/389 |

OTHER PUBLICATIONS

European Patent Office, Communication Pursuant to Article 94(3) EPC of co-pending European Patent Application No. 06 758 362.5-2413 having a mailing date of Aug. 1, 2008.

* cited by examiner

*Primary Examiner*—Kambiz Zand
*Assistant Examiner*—Yonas Bayou
(74) *Attorney, Agent, or Firm*—Hickman Palermo Truong & Becker LLP (57) ABSTRACT

A packet forwarding process, on a data communications device, forwards a packet to a plurality of destinations within a network from that data communications device using an "encrypt then replicate" method. The packet forwarding process receives a packet that is to be transmitted to the plurality of destinations, and applies a security association to the packet using security information shared between the data communications device, and the plurality of destinations, to create a secured packet. The secured packet contains a header that has a source address and a destination address. The source address is inserted into the header, and then the packet forwarding process replicates the secured packet, once for each of the plurality of destinations. After replication, the destination address is inserted into the header, and the packet forwarding process transmits each replicated secured packet to each of the plurality of destinations authorized to maintain the security association.

12 Claims, 6 Drawing Sheets

201 APPLIES A SECURITY ASSOCIATION TO THE PACKET USING SECURITY INFORMATION SHARED BETWEEN THE DATA COMMUNICATIONS DEVICE AND THE PLURALITY OF DESTINATIONS TO CREATE A SECURED PACKET

202 IDENTIFIES AN ENCRYPTION KEY FOR THAT PACKET BASED ON A DATA STREAM ASSOCIATED WITH THE PACKET

203 REGISTERS WITH A KEY DISTRIBUTION MANAGEMENT SYSTEM

204 PERFORMS AN AUTHENTICATION TECHNIQUE WITH THE KEY DISTRIBUTION MANAGEMENT SYSTEM

205 RECEIVES THE ENCRYPTION KEY FROM THE KEY DISTRIBUTION MANAGEMENT SYSTEM

206 INSTALLS THE ENCRYPTION KEY SUPPLIED BY THE KEY DISTRIBUTION MANAGEMENT SYSTEM

METHOD AND APPARATUS FOR DISTRIBUTING GROUP DATA IN A TUNNELED ENCRYPTED VIRTUAL PRIVATE NETWORK

BACKGROUND

Conventional computerized devices, such as personal computers, laptop computers, and data communications devices (e.g., routers, switches, gateways and the like) exchange data over networks using a variety of communications mechanisms. In order to ensure privacy during these exchanges, and to prevent any malicious attacks, it is often necessary to have a secured connection. An encrypted virtual private network, such as the Dynamic Multipoint Virtual Private Network (DMVPN) for example, creates these secured connections via encrypted tunnels between a device and each of its peers. The tunnels use pair-wise security associations, where only the two endpoints have the encryption keys for the tunnel. This is optimal for security since, generally, a spoke should only receive the packets sent to that particular spoke.

When a device acts as a hub, the device can send multicast and broadcast packets through these encrypted tunnels, each of which is encrypted separately. This situation is particularly common when dynamic routing is configured on routable tunnel interfaces connecting the hub to its peers (i.e. the destination of the packet). Dynamic routing protocols often broadcast routing packets to a Local Area Network (LAN). When the members of the LAN are all reachable through tunnels, the broadcast packet will be replicated, then encrypted and sent through each tunnel. The replicated broadcast packet is thus individually encrypted as it passes through an encrypted tunnel.

SUMMARY

Conventional technologies for sending packets, such as multicast and broadcast packets or other packets through an encrypted tunnel suffer from a variety of deficiencies. In particular, due to the nature of certain types of packets, such as broadcast or multicast packets, in which a single copy of a packet must be received by many recipient devices, these types of packets often need to be distributed in a downstream manner by being replicated onto many downstream data paths (i.e., tunnels). Conventional technologies that replicate such packets, and then encrypt the packets multiple times (one for each tunnel or downstream path) with pair-wise security associations (i.e. encryption keys that are exclusive to the hub and the receiving peer/destination), are limited by the processing capacity of the encryption engine. Conventional technologies are also limited by the requirement of pair-wise security associations, necessitating that each hub and receiving peer have an exclusive security association (i.e. encryption key pair) different from any other hub and peer security association. The requirement of encrypting each replicated packet individually (i.e. "replicate then encrypt") can overload the processing capability of the hub when many packets must be processed, reducing the hub's capacity to process packets. An overloaded queue can also reduce the hub's capacity to process other traffic (such as voice traffic) routed through the tunnel.

Embodiments disclosed herein significantly overcome such deficiencies and provide a system that includes a computerized device such as a data communications device executing a packet forwarding process for forwarding of packets to multiple destinations within a network. The packet forwarding process receives a packet that is to be transmitted to multiple destinations, and applies a shared security association (i.e. an encryption key) to the packet using security information shared between the data communications device and the multiple destinations (i.e. the data communications device and the multiple destinations are sharing a group encryption key), to create a secured packet. The packet forwarding process then replicates the secured packet for each of the multiple destinations and then transmits each replicated secured packet from the data communications device to each of the multiple destinations authorized to maintain the security association.

During an example operation of one embodiment, suppose a hub within a network receives a multicast routing packet, for example, an Enhanced Interior Gateway Routing Protocol (EIGRP) "Hello" packet, to be sent to a plurality of spokes. The multicast routing packet is forwarded to local multicast routing. The local multicast routing makes a call to Next Hop Resolution Protocol (NHRP) when the interface is a multipoint tunnel interface. NHRP recognizes that the multicast routing packet must be encrypted, and forwards it to a crypto engine for encryption. By encrypting before replications using a shared security associated that is known to the hub and to each destination that is to receive the packet, encryption only needs to be done once on that packet. Once encrypted, the Generic Routing Encapsulation (GRE) code replicates that packet by encapsulating the multicast routing packet, and creates a header for each replicated copy of the multicast packet. The header for each replicated packet contains a source address location, and a destination address location. The source address is inserted into the source address location within the header. After the encrypted/encapsulated multicast routing packet is replicated, the destination address is inserted into the header. The encrypted replicated packet is then transmitted to the destination for receipt. Since the encryption was performed using a shared security association known to both the source of the packet (i.e., the hub in the example above) and to each destination, each destination can receive and decrypt the packet in the same manner using the shared security association (e.g., shared encryption key information). In one embodiment, the clear-text multicast packet is first encapsulated by GRE, encrypted, and then replicated. For each replicated packet, the destination IP addresses is replaced with destination IP address for each spoke, and the packet is forwarded to that spoke. In another embodiment, the clear-text multicast packet is first encrypted, then replicated, encapsulated in GRE/IP, and forwarded to each spoke.

In one embodiment, the network is a non-broadcast multi-access (NBMA) network. The hub identifies an encryption key for the multicast routing packet, based on a data stream associated with the multicast routing packet, and then determines which spokes are authorized to have the encryption key. This process in one configuration is performed with the help of an encryption key distribution management system. The hub registers with the encryption key distribution management system, and receives the group encryption key after an authentication process. The hub installs the group encryption key. The hub maintains a list of spokes that have the capability to accept a group encryption key to decrypt the multicast routing packet. (Those spokes that cannot support a group encryption key are provided with a pair-wise encryption key, that is, an encryption key that is exclusive to that particular spoke and the hub transmitting the multicast routing packet.) The hub then transmits the encrypted multicast routing packet to the spokes that have the group encryption key. The hub receives new group encryption keys from the key distribution management system prior to the expiring of the expiration date of the group encryption key. The new group encryption key is used in future multicast routing packet transmissions.

Other embodiments disclosed herein include any type of computerized device such as a data communications device, computer, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessary to scale, emphasis instead being placed upon illustrating the principles disclosed herein.

DETAILED DESCRIPTION

Embodiments disclosed herein include a computer system that performs a packet forwarding process that receives a packet to be transmitted to a plurality of destinations. The packet forwarding process applies a shared security association (i.e. an encryption key or encryption technique known to a transmitter and many destinations) to the packet. For example, the forwarding process can encrypt the packet using an encryption key that is shared among all the destinations that are to receive the packet. The encrypted packet is then replicated, and transmitted to those destinations that indicate to the packet forwarding process that those destinations are capable of supporting the shared security association. Thus, the packet is encrypted once, but replicated many times (i.e. "encrypt, then replicate"), once for each of the destinations capable of supporting the shared security association (i.e. a group encryption key). This process is repeated for many packets in one or more multicast-like data streams so that all packets in the streams are received, encrypted, then replicated for each of multiple downstream destinations. Since encryption is only done once prior to replication for each packet in a stream, the system disclosed herein saves significant processing resources.

Figure 1:
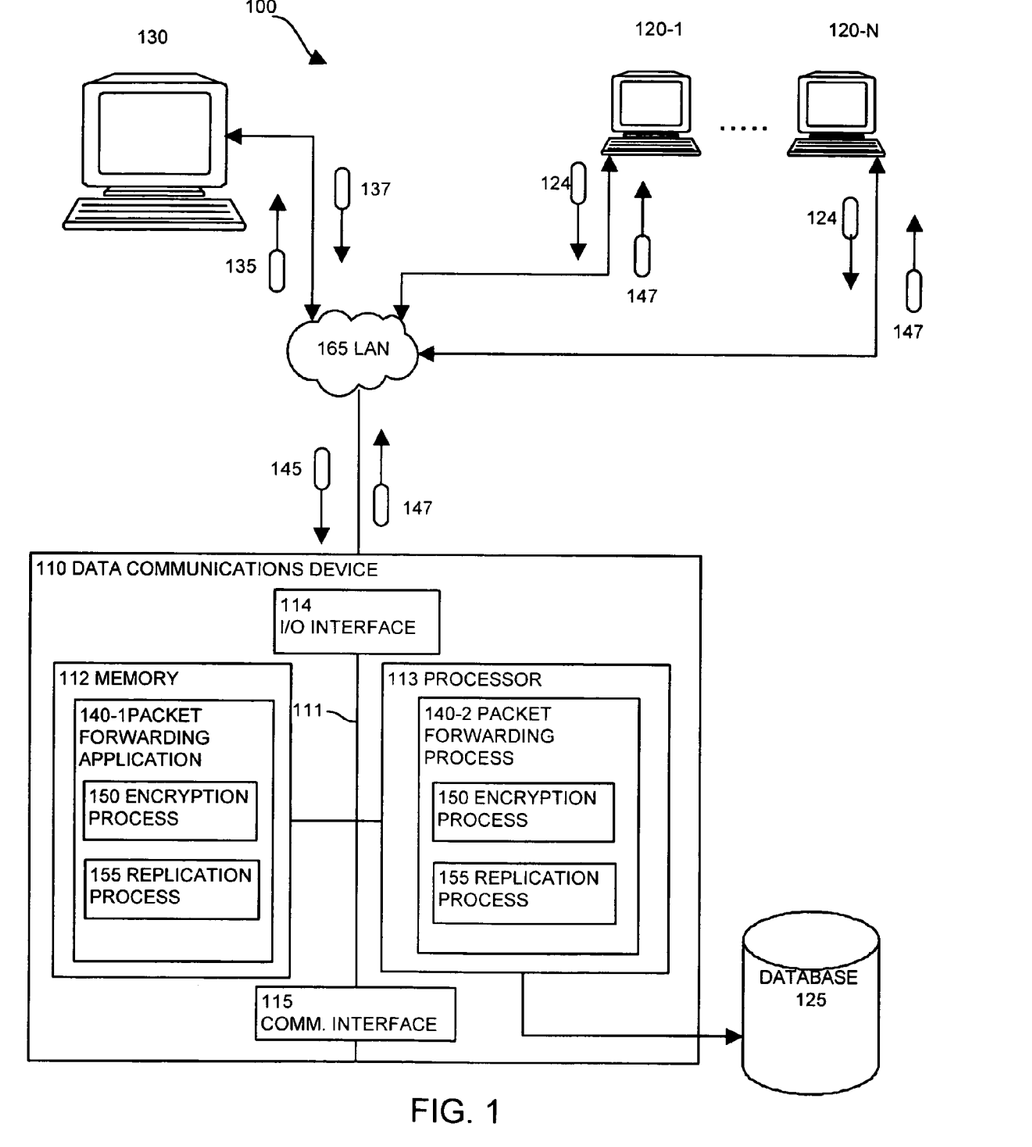
FIG. 1 shows a high-level block diagram of a data communications device according to one embodiment disclosed herein.

FIG. 1 is a block diagram illustrating example architecture of a data communications device 110 that executes, runs, interprets, operates or otherwise performs a packet forwarding application 140-1 and process 140-2. The packet forwarding process 140 runs an encryption process 150, and a replication process 155. The data communications device 110 may be any type of computerized device such as a personal computer, workstation, portable computing device, network terminal or the like, acting as a hub within a network environment 100. As shown in this example, the data communications device 110 includes an interconnection mechanism 111 such as a data bus or other circuitry that couples a memory system 112, a processor 113, an input/output interface 114, and a communications interface 115.

The memory system 112 is any type of computer readable medium, and in this example is encoded with a packet forwarding application 140-1. The packet forwarding application 140-1 may be embodied as software code such as data and/or logic instructions (e.g. code stored in the memory or on another computer readable medium such as a removable disk) that supports processing functionality according to different embodiments described herein. During operation of the data communications device 110, the processor 113 accesses the memory system 112 via the interconnect 111 in order to launch, run, execute, interpret or otherwise perform the logic instructions of the packet forwarding application 140-1. Execution of packet forwarding application 140-1 in this manner produces processing functionality in a packet forwarding process 140-2. In other words, the packet forwarding process 140-2 represents one or more portions of runtime instances of the packet forwarding application 140-1 (or the entire application 140-1) performing or executing within or upon the processor 113 in the data communications device 110 at runtime.

The communications interface 115 enables the data communications device 110 to communicate with other devices (i.e. other computers) on a local area network (LAN) or (WAN, Internet) 165. The data communications device 110 receives a packet 145 (that is to be forwarded to a plurality of destinations 120) via the LAN (WAN)165. The packet 145 is encrypted via the encryption process 150, using a shared security association 137 (i.e. an encryption key) received from the key distribution management system 130. The data communications device 110 sends an encryption key request 135 to the key distribution management system 130, and receives, from the key distribution management system 130, the shared security association 137. This step is done only once during the process. The replication process 155 replicates the encrypted packet, once for each of the plurality of destinations 120. The encrypted replicated packet 147 is transmitted to the plurality of destinations 120 that have the shared security association 137. The plurality of destinations 120 indicates to the data communications device 110 via a capability flag 124 that the plurality of destinations 120 is capable of supporting a shared security association 137. The data communications device 110 maintains a list of plurality of destinations 120 that support the shared security association 137 within a database 125 coupled to the data communications device 110.

Further details of configurations explained herein will now be provided with respect to a flow chart of processing steps that show the high level operations disclosed herein to perform the content formatting process.

Figure 2:
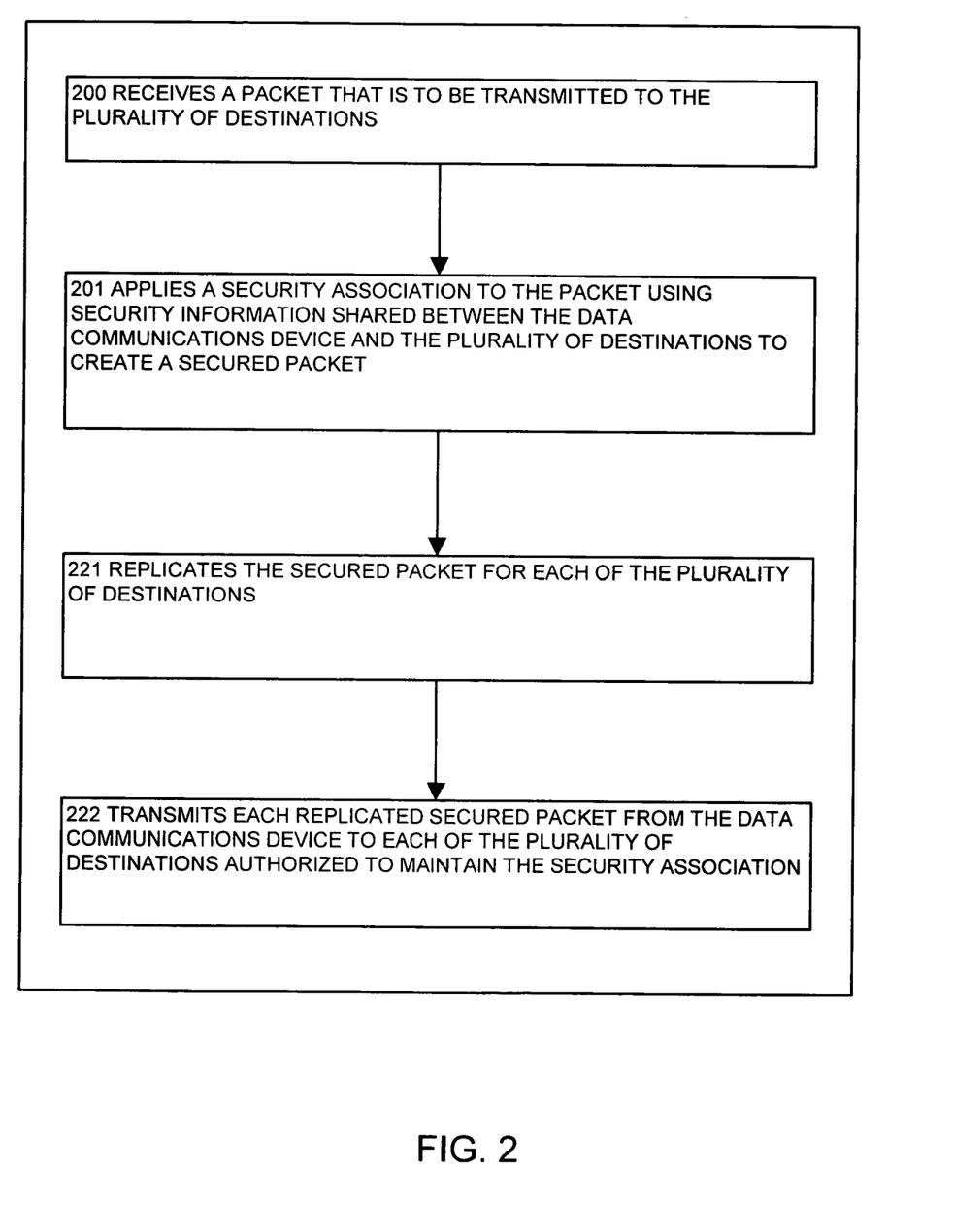
FIG. 2 illustrates a flowchart of a procedure performed by the system of FIG. 1 when the packet forwarding process receives a packet that is to be transmitted to the plurality of destinations, according to one embodiment disclosed herein.

FIG. 2 is a flowchart of the steps performed by the packet forwarding process 140 when it receives a packet 145 that is to be transmitted to the plurality of destinations 120. The packet forwarding process 140 encrypts the packet 145 using the shared security association 137 provided by the key distribution management system 130, and then replicates the packet 145, once for each of the plurality of destinations 120. The packet forwarding process 140 then transmits the encrypted replicated packet 147 to each of the plurality of destinations 120, where the encrypted replicated packet 147 is decrypted using the shared security association 137 that each of the plurality of destinations 120 received from the key distribution management system 130.

In step 200, the packet forwarding process 140 receives a packet 145 that is to be transmitted to the plurality of destinations 120. For example, within a DMVPN, the data communications device 110 acts as a hub within the network environment 100, transmitting multicast and broadcast packets to multiple spokes (i.e. the plurality of destinations 120) within the network environment 100. The multicast and broadcast packets are transmitted through secure encrypted tunnels created between the data communications device 110 and each of the plurality of destinations 120.

In step 201, the packet forwarding process 140 applies a security association to the packet 145 using security information shared between the data communications device 110 and the plurality of destinations 120, to create a secured packet. An encryption process 150, such as a crypto engine, encrypts the packet 145, using a shared security association 137 (i.e. a shared encryption key) received from the key distribution management system 130.

In step 221, the packet forwarding process 140 replicates the secured packet for each of the plurality of destinations 120, creating an encrypted replicated packet 147. Each encrypted replicated packet 147 contains an IP header with tunnel endpoints. The details of the header of the encrypted replicated packet 147 will be explained further within the sub step of 214.

In step 222, the packet forwarding process 140 transmits each encrypted replicated packet 147 from the data communications device 110 to each of the plurality of destinations 120 authorized to maintain the security association. Each of the plurality of destinations 120 authorized to maintain the security association has also received the shared security association 137 from the key distribution management system 130.

Figure 3:
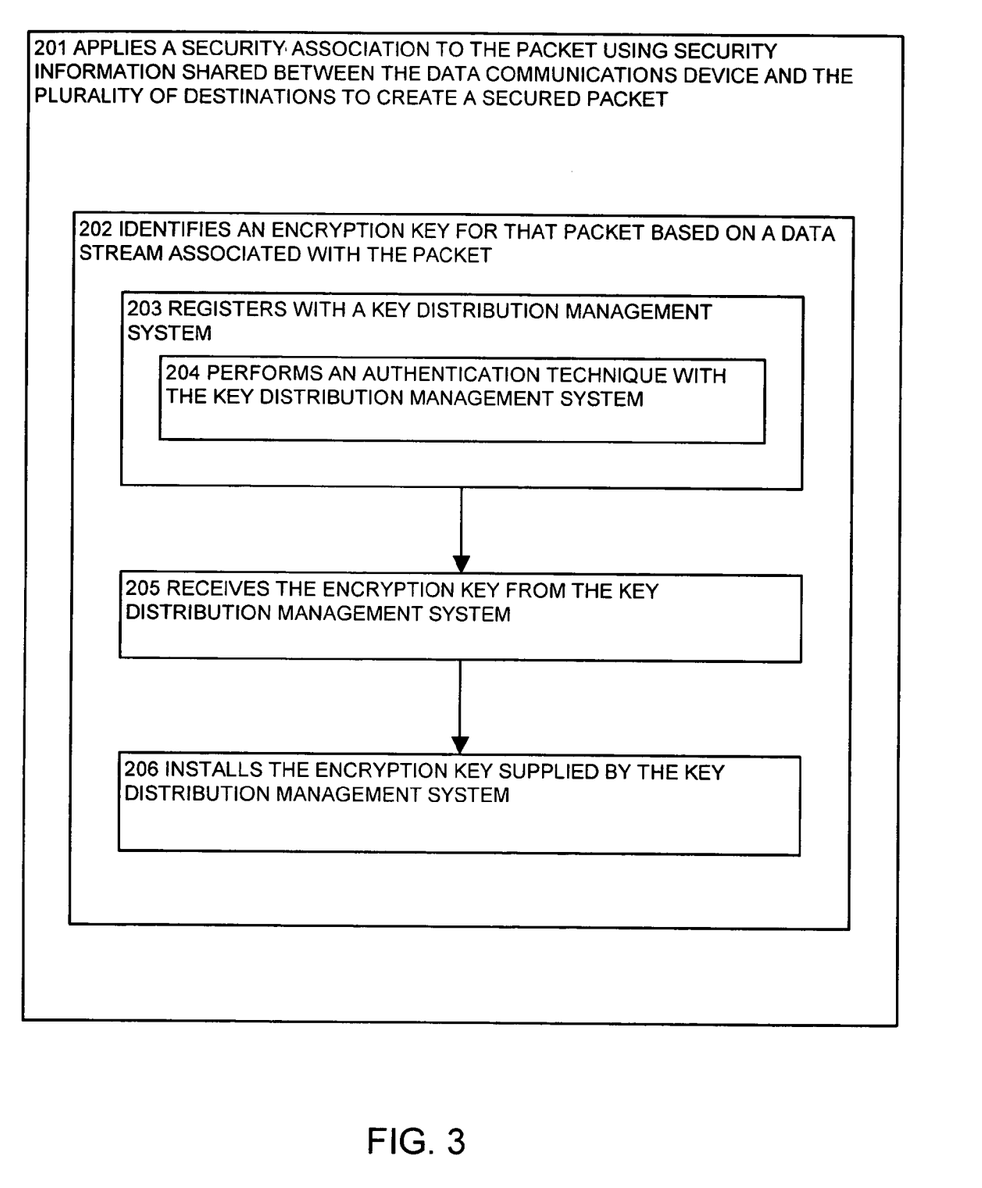
FIG. 3 illustrates a flowchart of a procedure performed by the system of FIG. 1 when the packet forwarding process applies a security association to the packet using security information shared between the data communications device, and the plurality of destinations to create a secured packet, according to one embodiment disclosed herein.

FIG. 3 is a flow chart of the steps performed by the packet forwarding process 140 when it applies a shared security association 137 to the packet 145 using security information shared between the data communications device 110 and the plurality of destinations 120 to create a secured packet. The packet forwarding process 140 encrypts the packet 145, using shared security association 137 received by the key distribution management system 130. The receiving plurality of destinations 120 also has the shared security association 137 from the key distribution management system 130.

In step 202, the packet forwarding process 140 identifies an encryption key for that packet 145 based on a data stream associated with the packet 145. For example, the network environment 100 may be a non-broadcast multi-access (NBMA) network. There may exist different shared security associations 137 for different multicast streams, with different spokes within the NBMA authorized to have some or all of the shared security associations 137. The packet forwarding process 140 would determine which shared security association 137 to use based on which of the plurality of destinations 120 is authorized to received that packet 145.

In step 203, the packet forwarding process 140 registers with a key distribution management system 130. The key distribution management system 130 may exist on the data communications device 110, or on a separate device. There may exist multiple hubs that each has a key distribution management system 130 so that a key distribution management system 130 is always available if a key distribution management system 130 on another device fails.

In step 204, the packet forwarding process 140 performs an authentication technique with the key distribution management system 130. The data communications device 110 is authenticated by the key distribution management system 130 prior to receiving the shared security association 137. The plurality of destinations 120 that use the shared security association 137 also register with the key distribution management system 130, and are authenticated prior to receiving the shared security association 137.

In step 205, the packet forwarding process 140 receives the encryption key from the key distribution management system 130. After authentication, the data communications device 110 receives the shared security association 137 from the key distribution management system 130. Likewise, after successful authentication, each of the plurality of destinations 120 also receives the shared security association 137 from the key distribution management system 130.

In step 206, the packet forwarding process 140 installs the encryption key supplied by the key distribution management system 130. The data communications device 110 using the shared security association 137 to send broadcast and multicast packets, installs the shared security association 137 in the outgoing direction, while the plurality of destinations 120 install the shared security association 137 in the incoming direction.

Figure 4:
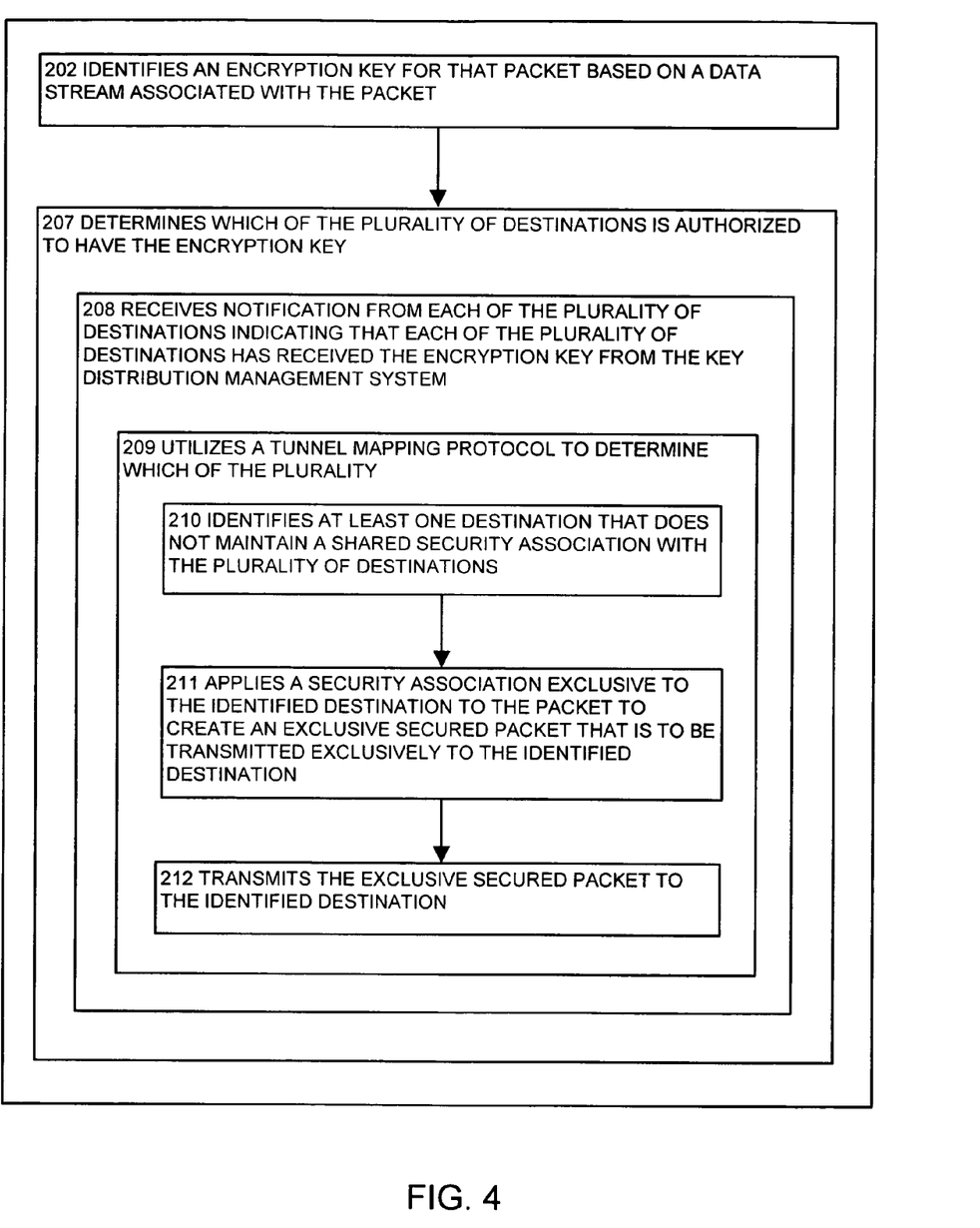
FIG. 4 illustrates a flowchart of a procedure performed by the system of FIG. 3 when the packet forwarding process identifies an encryption key for that packet based on a data stream associated with the packet, according to one embodiment disclosed herein.

FIG. 4 is a flow chart of the steps performed by the packet forwarding process 140 when it determines which of the plurality of destinations 120 is authorized to have the shared security association 137. If the data communications device 110 determines that a device that is intended to receive the packet 145 does not have the shared security association 137, the data communications device 10 uses pair-wise security associations.

In step 207, the packet forwarding process 140 determines which of the plurality of destinations 120 is authorized to have the encryption key. For example, the data communications device 110 can utilize Next Hop Resolution Protocol (NHRP) to map the encrypted tunnels created between the data communications device 110 and the plurality of destinations 120.

In step 208, the packet forwarding process 140 receives notification from each of the plurality of destinations 120 indicating that each of the plurality of destinations 120 has received the encryption key from the key distribution management system 130. For example, each of the plurality of destinations 120 sends a NHRP message to the data communications device 110, the message including a capability flag, indicating that particular destination is capable of supporting the shared security association 137.

In step 209, the packet forwarding process 140 utilizes a tunnel mapping protocol to determine which of the plurality of destinations 120 indicate successful receipt of the encryption key. For example, through the use of a capability flag sent within a NHRP message, the data communications device 110 determines which of the plurality of destinations 120 can support the shared security association 137.

In step 210, the packet forwarding process 140 identifies at least one destination that does not maintain a shared security association with the plurality of destinations 120. Any destination spoke that does not support the shared security association 137 (i.e. the group encryption key) will have to fall back on the pair-wise security association (i.e. an encryption key that is exclusive to the data communications device 110 and the destination).

In step 211, the packet forwarding process 140 applies a security association exclusive to the identified destination (i.e. that destination which does not support the group encryption key) to the packet to create an exclusive secured packet that is to be transmitted exclusively to the identified destination. When the data communications device 110 identifies a destination that does not support the shared security association 137, the data communications device 110 creates an exclusive shared association (i.e. an exclusive encryption key) with that destination.

In step 212, the packet forwarding process 140 transmits the exclusive secured packet to the identified destination. The data communications device 110 transmits the encrypted packet (encrypted exclusively between the data communications device 110 and the destination) to the destination. In effect, if the destination does not support group encryption, or if an attempt to register with the key distribution management system 130 has failed, the data communications device 110 falls back on the old method of 'replicate then encrypt'.

Figure 5:
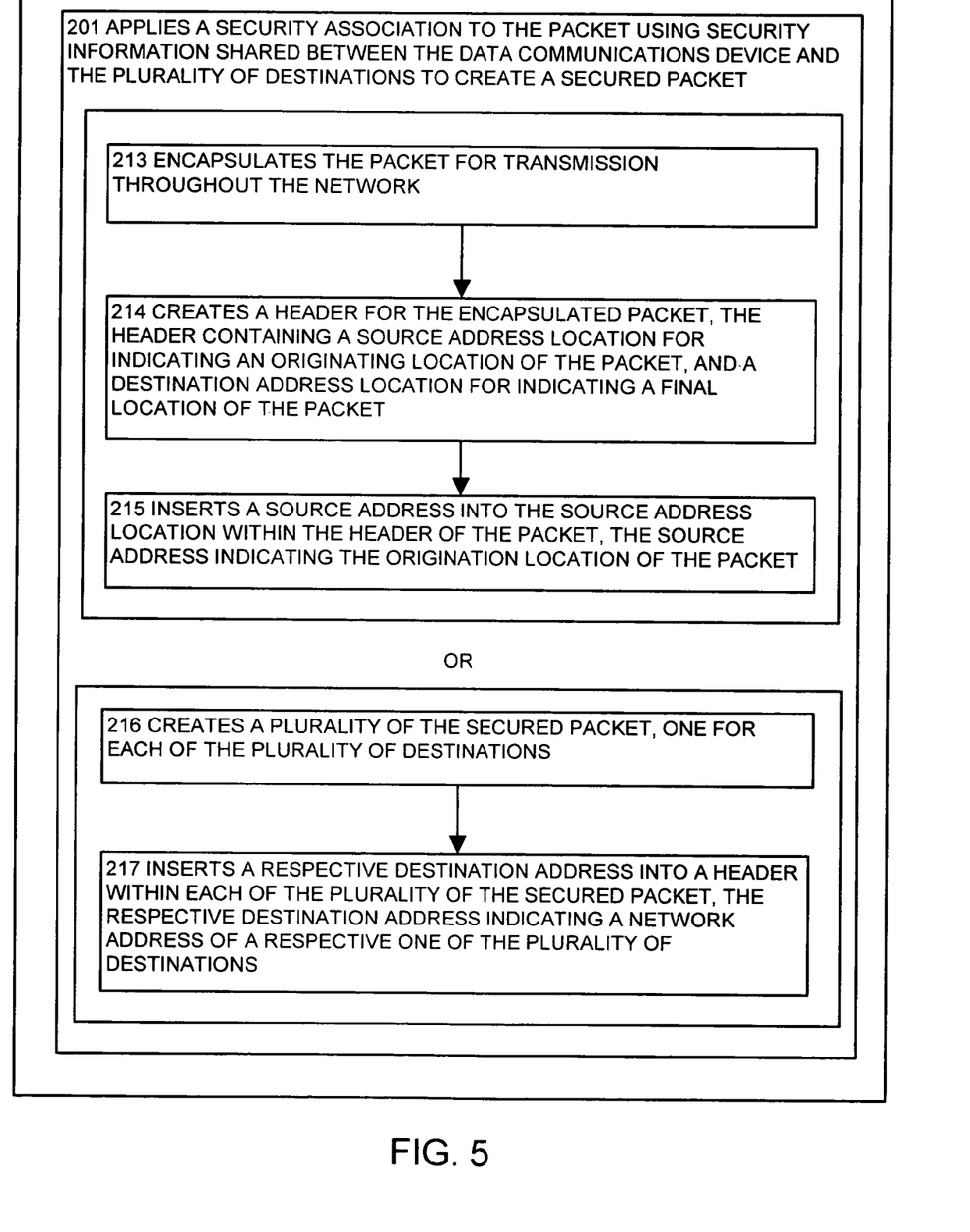
FIG. 5 illustrates a flowchart of a procedure performed by the system of FIG. 1 when the packet forwarding process applies a security association to the packet using security information shared between the data communications device, and the plurality of destinations to create a secured packet, according to one embodiment disclosed herein.

FIG. 5 is a flow chart of the steps performed by the packet forwarding process 140 when it applies a security association to the packet 145 using security information shared between the data communications device 110 and the plurality of destinations 120 to create a secured packet. The packet 145 is encapsulated with an IP header containing a source address and a destination address. The source address is the same for all encrypted replicated packets 147, but the destination address is different for each of the plurality of destinations 120.

In step 213, the packet forwarding process 140 encapsulates the packet 145 for transmission throughout the network. For example, the data communications device 110 may use Generic Routing Encapsulation (GRE) to encapsulate the packet that will be encrypted, and then replicated.

In step 214, the packet forwarding process 140 creates a header for the encapsulated packet, the header containing a source address location for indicating an originating location of the packet 145 (i.e. the address location of the data communications device 110), and a destination address location for indicating a final location of the packet (i.e. the address locations for each of the plurality of destinations 120).

In step 215, the packet forwarding process 140 inserts a source address into the source address location within the header of the packet 145, the source address indicating the origination location of the packet 145 (i.e. the address location of the data communications device 110). Since the source address will remain the same for all of the replicated packets, the source address can be inserted prior to replicating the packet 145.

In step 216, the packet forwarding process 140 creates a plurality of the secured packets, one for each of the plurality of destinations 120. The original packet 145 is now encrypted and replicated, becoming the encrypted replicated packet 147. The encrypted replicated packet 147 has a header containing only the source address (i.e. the address location of the data communications device 110).

In step 217, the packet forwarding process 140 inserts a respective destination address into a header within each of the plurality of the secured packet, the respective destination address indicating a network address of a respective one of the plurality of destinations. After the packet has been encrypted and replicated, becoming the encrypted replicated packet 147, the data communications device 110 individually inserts the address of each of the plurality of destinations 120 into each of the encrypted replicated packet 147.

Figure 6:
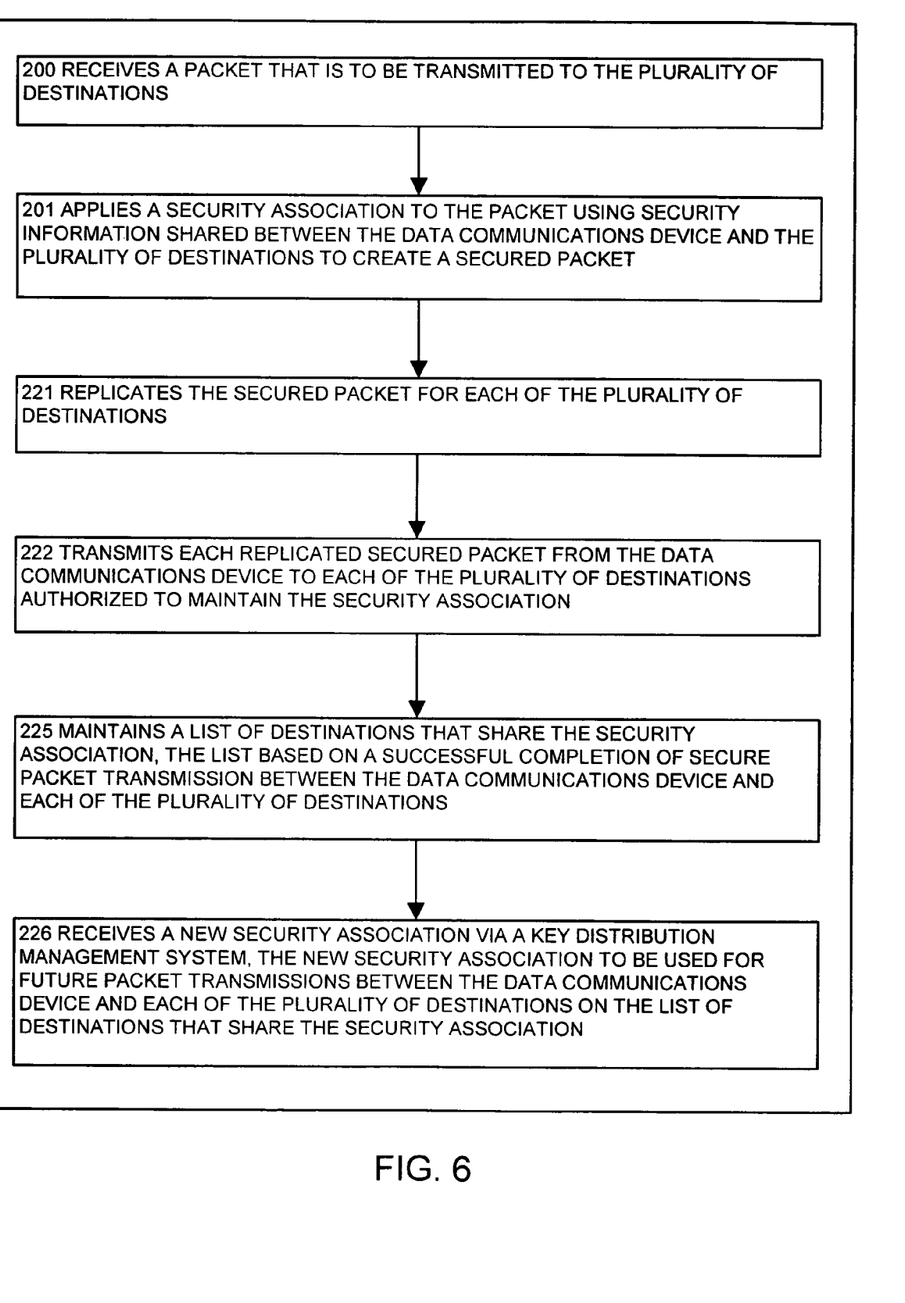
FIG. 6 illustrates a flowchart of a procedure performed by the system of FIG. 1 when the packet forwarding process receives a packet that is to be transmitted to the plurality of destinations, according to one embodiment disclosed herein.

FIG. 6 is a flow chart of the steps performed by the packet forwarding process 140 when it receives a packet that is to be transmitted to the plurality of destinations 120. The packet forwarding process 140 applies a shared security association 137 to the packet using security information shared between the data communications device 110 and the plurality of destinations 120 to create a secured packet. The packet forwarding process 140 then replicates the secured packet for each of the plurality of destinations 120, and transmits each encrypted replicated packet 147 from the data communications device 110 to each of the plurality of destinations 120 authorized to maintain the security association.

In one embodiment, in step 225, the packet forwarding process 140 maintains a list of destinations that share the security association, the list based on a successful completion of secure packet transmission between the data communications device 110 and each of the plurality of destinations 120. The list is stored within a database 125.

In step 226, the packet forwarding process 140 receives a new security association via the key distribution management system 130, the new security association to be used for future packet transmissions between the data communications device 110 and each of the plurality of destinations 120 on the list of destinations that share the security association. Each shared security association 137 provided by the key distribution management system 130 contains an expiration date. Prior to the expiration date, the key distribution management system 130 sends out a new shared security association 137 (with a new expiration date) within a 're-key' message, to insure that the data communications device 110 and all of the plurality of destinations 120 have a valid shared security association 137.

1. In one embodiment, the process is performed in the order of the steps listed below. The hub router comes up and authenticates with group key server and gets group key.
2. The spoke router comes up and authenticates with hub router and gets a pair-wise encryption key to be used for both unicast and multicast packets.
3. If spoke is capable of using a group key it goes to the group key server and authenticates and gets the group key. The hub then adds this spoke to the list of spokes that can have its multicast packets encrypted using the group key.
4. If a multicast packet is now to be sent out to the spoke routers. A copy of the multicast packet is encrypted with the group, then replicated and forwarded to the spokes that support using the group key.
5. For those spokes that don't support the group key, the multicast packet is replicated (once for each of the spokes); each copy is individually encrypted and forwarded to the spokes.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method, comprising:
   receiving a packet from a sender at a data communication device, wherein the packet is to be multicast to a plurality of destinations;
   identifying a multicast security association related to the packet based, at least in part, on a data stream associated with the packet and security information shared between the data communications device and the plurality of destinations;
   in response to determining that the security association related to the packet is shared between the data communications device and the plurality of destinations:
      creating a secure packet by applying the security association to the packet using a group key that is shared between the data communications device and the plurality of destinations; replicating the secured packet into a plurality of replicated secured packets;
      for one of the replicated secured packets destined to a particular destination of a multicast group: appending, to that one of the replicated secured packets, a new header having a sender address location and a particular destination address location; transmitting that one of the replicated secured packets to the particular destination;
   in response to determining that the security association related to the packet is shared between the data communications device and a particular destination but not the plurality of destinations:
      for the particular destination: applying the security association to a copy of the packet using a pair-wise key that is shared between the data communications device and the particular destination to create a secured packet; appending, to the secured packet, a new header having a sender address location and a particular destination location; transmitting the secured packet to the particular destination, where the particular destination is a member of the multicast group;
   wherein the method is performed by the data communication device.

2. The method of claim 1, further comprising a key distribution management system that is located on a device other than the data communications device, and where identifying a security association further comprises:
   registering with the key distribution management system by performing an authentication technique with the key distribution management system; and
   receiving notification from each of the plurality of destinations by utilizing a tunnel mapping protocol to determine which of the plurality of destinations indicate successful receipt of an encryption key.

3. The method of claim 2, where utilizing a tunnel mapping protocol comprises:
   identifying at least one destination that does not maintain a shared security association with the plurality of destinations;
   applying a security association exclusive to the identified destination to the packet to create an exclusive secured packet that is to be transmitted exclusively to the identified destination; and
   transmitting the exclusive secured packet to the identified destination;
   where the tunnel mapping protocol is a next-hop resolution protocol (NHRP).

4. The method of claim 3, where applying a security association to the packet to create a secured packet comprises:
   encapsulating the packet for transmission throughout a network;
   creating a header for the encapsulated packet, the header comprising a source address location for indicating an originating location of the packet, and a destination address location for indicating a final location of the packet; and
   inserting a source address into the source address location within the header of the packet, the source address indicating the origination location of the packet.

5. The method of claim 4, where applying a security association to the packet to create a secured packet comprises:
   creating a plurality of the secured packets, for the plurality of destinations; and
   inserting a respective destination address into the header within the plurality of the secured packets, the respective destination address indicating a network address of a respective one of the plurality of destinations.

6. The method of claim 4, where the network is a Dynamic Multipoint Virtual Private Network (DMVPN), and is a non-broadcast multi-access (NBMA) network, and
   where the security associations include shared encryption information available to the plurality of destinations and to the data communications device and
   where applying the security association to the packet to create the secured packet comprises:
   applying the shared encryption information to encrypt the packet once regardless of the number of destinations to which the packet is transmitted.

7. A computer-readable medium encoded with instructions, which when executed on a processor, cause the processor to perform:
   receiving a packet from a sender at a data communication device, wherein the packet is to be multicast to a plurality of destinations;
   identifying a multicast security association related to the packet based, at least in part, on a data stream associated with the packet and security information shared between the data communications device and the plurality of destinations;

in response to determining that the security association related to the packet is shared between the data communications device and the plurality of destinations:

creating a secure packet by applying the security association to the packet using a group key that is shared between the data communications device and the plurality of destinations; replicating the secured packet into a plurality of replicated secured packets;

for one of the replicated secured packets destined to a particular destination of a multicast group: appending, to that one of the replicated secured packets, a new header having a sender address location and a particular destination address location; transmitting that one of the replicated secured packets to the particular destination;

in response to determining that the security association related to the packet is shared between the data communications device and a particular destination but not the plurality of destinations:

for the particular destination: applying the security association to a copy of the packet using a pair-wise key that is shared between the data communications device and the particular destination to create a secured packet; appending, to the secured packet, a new header having a sender address location and a particular destination location; transmitting the secured packet to the particular destination, where the particular destination is a member of the multicast group.

8. The computer-readable medium of claim 7, wherein the instructions operate with a key distribution management system that is located on a device other than the data communications device, and wherein the instructions that cause the operation of identifying a security association further comprise instructions, which when executed cause the operation of registering with the key distribution management system by performing an authentication technique with the key distribution management system; and receiving notification from each of the plurality of destinations by utilizing a tunnel mapping protocol to determine which of the plurality of destinations indicate successful receipt of an encryption key.

9. The computer-readable medium of claim 8, wherein the instructions that cause the operation of utilizing a tunnel mapping protocol further comprise instructions which when executed cause the operation of:

identifying at least one destination that does not maintain a shared security association with the plurality of destinations;

applying a security association exclusive to the identified destination to the packet to create an exclusive secured packet that is to be transmitted exclusively to the identified destination; and transmitting the secured packet to the identified destination;

wherein the tunnel mapping protocol is a next-hop resolution protocol (NHRP).

10. The computer-readable medium of claim 9, wherein the instructions that cause the operation of applying a security association to the packet to create a secured packet further comprise instructions which when executed cause the operation of:

encapsulating the packet for transmission throughout a network;

creating a header for the encapsulated packet, the header comprising a source address location for indicating an originating location of the packet, and a destination address location for indicating a final location of the packet; and inserting a source address into the source address location within the header of the packet, the source address indicating the origination location of the packet.

11. The computer-readable medium of claim 10, wherein the instructions that cause the operation of applying a security association to the packet to create a secured packet further comprise instructions which when executed cause the operation of:

creating a plurality of secured packets, for the plurality of destinations; and inserting a respective destination address into the header within the plurality of the secured packets, the respective destination address indicating a network address of a respective one of the plurality of destinations.

12. The computer-readable medium of claim 11, wherein the network is a Dynamic Multipoint Private Network (DM-VPN), and is a non-broadcast multi-access (NBMA) network;

wherein the security associations include shared encryption information available to the plurality of destinations and to the data communications device;

wherein the instructions that cause the operation of applying the security association to the packet to create the secured packet further comprise instructions which when executed cause applying the shared encryption information to encrypt the packet once regardless of the number of destinations to which the packet is transmitted.

* * * * *